United States Patent
Zuern et al.

(10) Patent No.: US 9,879,483 B2
(45) Date of Patent: Jan. 30, 2018

(54) DRILL HEAD INSERT OR DRILL HEAD ATTACHMENT AND DRILL

(71) Applicant: DreBo Werkzeugfabrik GmbH, Athshausen (DE)

(72) Inventors: Alexander Zuern, Altshausen (DE); Alexis Ickert, Aulendorf (DE); Martin Stumpp, Ravensburg (DE)

(73) Assignee: DREBO WERKZEUGFABRIK GMBH, Altshausen (DE)

( * ) Notice: Subject to any disclaimer, the term of this patent is extended or adjusted under 35 U.S.C. 154(b) by 575 days.

(21) Appl. No.: 14/536,179

(22) Filed: Nov. 7, 2014

(65) Prior Publication Data
US 2016/0130880 A1    May 12, 2016

(51) Int. Cl.
| | | |
|---|---|---|
| E21B 10/44 | (2006.01) | |
| B28D 1/14 | (2006.01) | |
| E21B 10/42 | (2006.01) | |

(52) U.S. Cl.
CPC ............ *E21B 10/445* (2013.01); *B28D 1/146* (2013.01); *E21B 10/42* (2013.01); *B23B 2226/75* (2013.01); *Y10T 408/909* (2015.01)

(58) Field of Classification Search
CPC ... E21B 10/445; B23B 2226/75; B28D 1/146; Y10T 408/909
See application file for complete search history.

(56) References Cited

U.S. PATENT DOCUMENTS

| | | | | |
|---|---|---|---|---|
| 5,338,135 A | * | 8/1994 | Noguchi | B23B 51/02 408/200 |
| 6,270,297 B1 | * | 8/2001 | Fang | B23B 51/0009 407/116 |
| 6,371,702 B1 | * | 4/2002 | DeWald, Jr. | B23B 51/0009 408/227 |
| 8,960,336 B2 | * | 2/2015 | Kersten | B23B 51/02 175/398 |
| 2004/0067114 A1 | * | 4/2004 | Stokey | B23B 51/0009 408/227 |
| 2005/0092528 A1 | * | 5/2005 | Kersten | B23B 51/02 175/395 |
| 2011/0168453 A1 | * | 7/2011 | Kersten | B23B 51/02 175/415 |

FOREIGN PATENT DOCUMENTS

| | | | | |
|---|---|---|---|---|
| GB | 2201910 A | * | 9/1988 | ............ B23B 51/02 |
| WO | WO 2012/154644 A1 | * | 11/2012 | ............ B23B 51/02 |

* cited by examiner

*Primary Examiner* — Robert E Fuller
(74) *Attorney, Agent, or Firm* — Johnson, Marcou & Isaacs, LLC; Jennifer S. Stachniak

(57) ABSTRACT

A drill head insert or drill head attachment, in particular a drill plate made of hard metal, for a rock drill, includes cutting edges (20, 20a) configured on the feed side which extend from a tip of the drill (18) rearward in a receding manner to an outer face (12, 14) of the drill plate (10). A drill plate (10) is substantially configured in the form of a roof when viewed from the side. A free face (24, 24a) at the cutting edge (20, 20a) abuts against a cutting face (22, 22a) along a substantial part of its extension between the tip of the drill (18) and the outer face (12, 14). A substantially smooth contour of the cutting edge (20, 20a) is interrupted by at least one projection (30, 30a, 30b) which projects beyond the cutting edge (20, 20a) in the feed direction.

13 Claims, 3 Drawing Sheets

DRILL HEAD INSERT OR DRILL HEAD ATTACHMENT AND DRILL

BACKGROUND OF THE INVENTION

The invention relates to a drill head insert or a drill head attachment and to a drill.

Drill head inserts and drill head attachments are typically used in drills to facilitate the feed of the drill in material which is difficult to machine, for instance concrete or rock. For this purpose, typical drill plates comprise cutting edges as drill head inserts which are configured between respective cutting faces and respective free faces. When viewed in the direction of rotation of the drill, the cutting face is in front of the cutting edge, whereas the free face is behind the cutting edge when viewed in direction of rotation of the drill. The cutting edge contributes to remove material to a substantial degree.

It is known that the drill properties of drill plates of this kind can be improved by providing the cutting edge, the adjacent cutting face and/or the adjacent free face with depressions. In this way, for instance, a profile of the contact pressure of the drill plate to the material can be optimized when axial pressure is applied and it can be ensured that good destruction forces can be achieved even if an impact drive synchronized with a rotary drive is used. Exemplary embodiments can be taken from the documents DE 297 23 948 U1, GB 2 201 910 A and DE 299 22 291 U1.

In drill plates of this type a crest line remains above a tip of the drill. The contact face (line contact) of the cutting edge is shortened in this manner, while the total length of cutting edges is increased at the same time. It has shown that this has a decelerating effect on the drilling progress which can also be referred to as drilling rate.

Tests have shown that the drilling progress is highly dependent on the tip of the drill. In the center of the tip of the drill no rotary movement (cutting speed) takes place. For this reason, the drilling progress is decelerated. If depressions are present, as is the case in drill plates which are known according to the prior art, the crest line remains unchanged and can thus not accelerate the drilling progress.

SUMMARY OF THE INVENTION

Thus, the invention is based on the task of providing a drill head insert or a drill head attachment which facilitates greater drilling progress.

Surprisingly, the drilling progress can be increased using the inventive measures. This is especially due to the fact that the projection ensures a dot-shaped application of the force of the cutting edge into the material to be machined. In other words, the projection acts like a breaker and/or crack formation device.

Contrary to the state of the art, in the inventively provided production of a projection material is attached and not removed, as is the case with depressions. While the removal of material has been preferred hitherto for cost- and material-saving reasons, in the context of the invention it has shown that attaching a projection justifies the overhead connected to it due to better drill properties.

Preferably, the substantially smooth layout of the cutting edge is interrupted by a plurality of projections, in particular two projections, which project from the cutting edge in the feed direction. In this way, two or more breakers can be provided in the cutting edge which can still further increase the drilling progress.

In this connection, the invention is described on the basis of a drill plate as a drill head insert by way of example; however, drill head inserts and attachments are also to be understood in this connection implicitly.

The drill plate comprises only one cutting edge which is arranged only on one side of an axis of rotation of the drill—which typically runs through the tip of the drill plate—when the drill plate is used in the drill head of a drill. This embodiment corresponds to an asymmetric embodiment. This solution is already sufficient for numerous applications.

According to a development, the drill plate comprises a further cutting edge which extends from the tip of the drill rearward in a sloped and receding manner to an opposite outer face of the drill plate, wherein the drill plate is substantially configured in the form of a roof also between the tip of the drill and the opposite outer face of the drill plate when viewed from the side, and wherein a further free face at the further cutting edge abuts against a further cutting face along a substantial part of its extension between the tip of the drill and the opposite outer face. The further free face is arranged in a diagonal and opposite manner to the free face relative to the tip of the drill and the further cutting face is arranged in a diagonal and opposite manner to the cutting face relative to the tip of the drill.

In this connection, an opposite outer face is typically an outer face offset by about 180° to the previously mentioned outer face relative to the tip of the drill. This facilitates in particular a planar embodiment of the drill plate 10.

The drilling progress can be increased further by means of the further cutting edge. For this purpose, it is not absolutely necessary that a projection is also formed at the further cutting edge. It is possible, however, as is described below.

According to a development, a substantially smooth contour of the further cutting edge is interrupted by exactly one projection which projects beyond the cutting edge in the feed direction.

According to a development alternative hereto, a substantially smooth contour of the further cutting edge is interrupted by a plurality of projections, in particular two projections, which project beyond the further cutting edge in the feed direction.

The aforementioned formation of projections also at the further cutting edge achieves the above mentioned operating principle of a projection also at the further cutting edge. Thus, drilling progress can be increased even further.

In a preferred embodiment, a drill plate with one cutting edge and one further cutting edge comprises a total of three projections, namely two at the cutting edge and one at the further cutting edge. This has proved to be particularly advantageous for specific material which are to be machined.

In an additionally preferred manner, respective projections beyond a cutting face and/or a free face are each substantially configured in the form of a part of an egg. This can mean that the projection comprises a shape of this type only beyond the cutting face. It can also mean that the projection comprises a shape of this type only beyond the free face. It can further mean that the projection comprises a shape of this type both beyond the cutting face and beyond the free face. In this case, preferably at the transition between both shapes a sharp edge is formed which further preferably abuts against the corresponding cutting edge.

According to a preferred embodiment, a clearance angle at a respective projection is larger than outside of the projections. Thus, a clearance angle is the angle between a face positioned at a right angle to the axis of rotation and the free face or a continuation of the free face on a respective projection.

According to a further preferred embodiment, a cutting angle at a respective projection is larger than outside of the projections. Thus, a cutting angle is the angle between a face positioned at a right angle to the axis of rotation and the cutting face or a continuation of the cutting face on a respective projection.

Both embodiments which have just been described can also be combined with one another. If only one of both embodiments is to be selected, it has proved advantageous if only the clearance angle at the respective projection is larger than outside of the projection. In this case, the cutting face can preferably be continued along the projection in a planar manner.

Preferably, the drill plate further comprises a center point projecting from the tip of the drill in the direction of the feed. It can be used to improve the positioning of a drill which comprises the drill plate. In this way, misdrills can be prevented.

It is further preferred that the drill plate comprises a chamfer which is provided at the end side of the drill plate. In this way, the permanent stability of the drill plate can be increased advantageously.

Further, the invention relates to a drill head for a drill which comprises exactly one inventive drill plate.

Further, the invention also relates to a drill head which comprises a plurality of inventive drill plates.

With the help of the inventive drill heads the advantages of an inventive drill plate described further above can be utilized for a drill head. In doing so, all above described embodiments and modifications can be reverted to. The mentioned advantages will apply accordingly.

Further, the invention relates to a drill, in particular a rock drill and/or a drill for drilling concrete, comprising a shank and an inventive drill head. A drill of this type can be used to utilize the advantages of an inventive drill plate for a drill described further above. In doing so, all above described embodiments and modifications can be reverted to. The mentioned advantages will apply accordingly.

The shank of a drill of this type is typically configured to convey loose material from the drill head to the outside. For this purpose, an external thread can be configured in the shank, for instance.

Furthermore, the invention relates to a method of forming a drilling hole in a material, in particular concrete, wherein an inventive drill is used, and wherein every projection ensures a dot-shaped application of force into the material.

The inventive method uses the advantages of an inventive drill which advantages have been described further above. Here, it comes to advantage that the projections of the drill plate lead to an advantageous removal of material by means of the dot-shaped application of force which has been mentioned earlier.

Preferably, respective projections act like a breaker, in particular a concrete breaker, in the material. In this way, a particularly large amount of material can be broken out of the drilling hole and be subsequently removed by the shank of the drill in an appropriate manner.

Here, the invention is described on the basis of a drill plate. It represents a possible embodiment of the invention, namely as a drill head insert, which is typically inserted into a slot of the drill to form a two-flute cutter.

Alternatively, multi-flute cutters can equally be used, for instance three-flute cutters, four-flute cutters or even five-flute cutters, which are inserted into correspondingly formed slots of drills to form the drill head, or solid hard metal heads, too, which are typically attached to the drill in a planar manner and thus form drill head attachments.

BRIEF DESCRIPTION OF THE DRAWINGS

Further advantages, details and features may be taken from the following description of several exemplary embodiments of the invention in conjunction with the drawing.

DETAILED DESCRIPTION OF THE PREFERRED EMBODIMENTS

Figure 1:
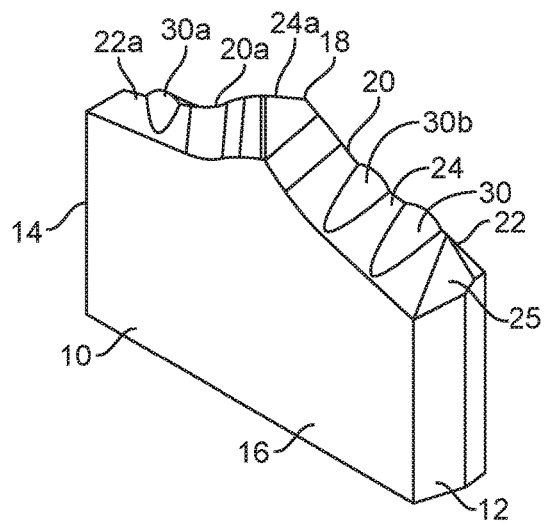
FIG. 1 shows a perspective view of a drill plate in one embodiment of the invention.

FIG. 1 shows an exemplary embodiment of a drill plate 10. The drill plate 10 comprises a first outer face 12 and an opposite second outer face 14 which is not visible in FIG. 1. A front side 16 is located between the outer faces 12, 14.

The drill plate 10 consists of hard metal in order to exhibit particularly high strength.

The drill plate 10 comprises a tip of the drill 18 which represents the location at which the drill plate 10 has the longest extension in the feed direction. In the illustration of FIG. 1, the feed direction is directed upwards. The tip of the drill 18 is configured as a center point at the same time in order to facilitate the contact of the drill plate 10 with a marking and to prevent misdrills in this manner.

When using the drill plate 10 in a drill head of a drill an axis of rotation of the drill typically runs through the tip of the drill 18 about which axis of rotation it is usually being rotated when using the drill in drilling operations, for instance by a drilling machine.

The drill plate 10 comprises a first cutting edge 20 and a second cutting edge 20a which are configured at a side of the drill plate 10 facing the feed direction. Two faces each abut against the cutting edges 20, 20a, namely in case of the first cutting edge 20, a cutting face 22 which is not visible in FIG. 1 and a first free face 24, and in case of the second cutting edge 20a, a second cutting face 22a and a second free face 24a which is not visible in FIG. 1.

As can be seen from FIG. 1, the drill plate 10 comes to a finish in a chamfer 25 at its radially outer end which chamfer extends between the outer face 12 and the cutting face 22 on the one hand and the free face 24 on the other hand at an oblique angle relative to them.

The chamfer 25 can be configured such that it extends in a two-piece manner, i.e. in the region of the free face 24 at a different angle than in the region of the cutting face 22, as can be seen from FIG. 1.

When the drill which comprises the drill plate 10 is rotated, the cutting faces 22, 22a are usually oriented in the direction of rotation. The free faces 24, 24a are usually oriented against the direction of rotation. Thus, the drill plate 10 removes material by means of the cutting faces 22, 22a and the cutting edges 20, 20a.

The cutting edges 20, 20a extend from the tip of the drill 18 rearward in a receding and sloped manner to the respective outer face 12, 14. The term "rearward" can here be understood approximately as "against the feed direction".

The cutting edges 20, 20a comprise a substantially smooth contour. This smooth contour is interrupted, however, by a first projection 30, a second projection 30a and a third projection 30b. The projections 30, 30a, 30b project beyond the cutting edges 20, 20a in the feed direction.

In doing so, the projections 30, 30a, 30b act as a breaker, e.g. a concrete breaker for a concrete drill. In this way, a drilling progress can be increased substantially.

The first and the third projections 30, 30b project beyond the first cutting edge 20. The second projection 30a projects beyond the second cutting edge 20a. Thus, the arrangement is asymmetrical in the present case.

Because of this arrangement the projection 30a acts at exactly that location which has been left out of consideration by the projections 30 and 30b such that the desired breaking effect is particularly good.

Figure 2:
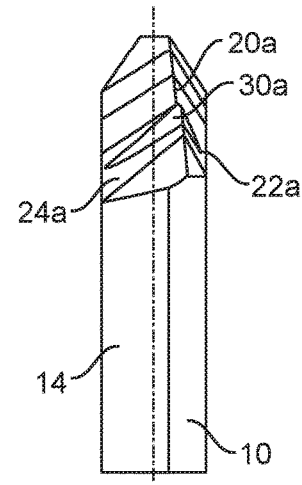
FIG. 2 shows a side view of a drill plate in one embodiment of the invention.

FIG. 2 shows the drill plate 10 in a side view. Here, the second outer face 14 can be seen which is not visible in FIG. 1. Furthermore, it can also be seen that the second cutting face 22a and the second free face 24a abut against each other at the second cutting edge 20a in a roof-like manner. Altogether, a roof-shaped design of the drill plate 10 is achieved in this way.

Figure 3:
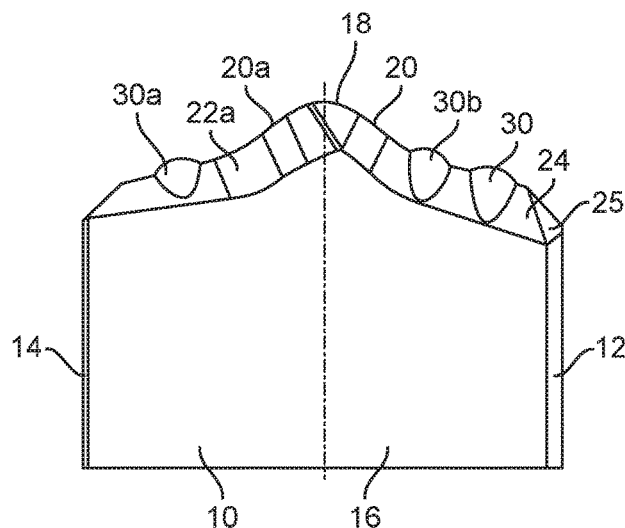
FIG. 3 shows a front view of a drill plate in one embodiment of the invention.

FIG. 3 shows the drill plate 10 in a front view. Here, the front side 16 is the focus of attention. With regard to the further details, it can be referred comprehensively to the description of FIG. 1.

Figure 4:
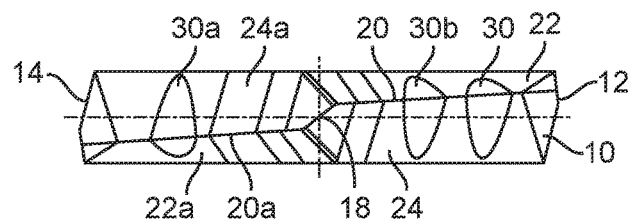
FIG. 4 shows a plan view of a drill plate in one embodiment of the invention.

FIG. 4 shows the drill plate 10 in a plan view. In other words, FIG. 4 shows the drill plate 10 in a view contrary to the feed direction of a material to be removed.

As can be seen, the outlines of the projections, i.e. the regions which are elevated compared to the cutting face and the free face, are roughly egg-shaped.

It is to be seen that the second cutting face 22a is diagonally opposite to the first cutting face 22 relative to the tip of the drill 18. Likewise, the second free face 24a is diagonally opposite to the first free face 24 relative to the tip of the drill 18. The projections 30, 30a, 30b are arranged in a centrally asymmetric manner and each extend along the entire depth of the corresponding free face or cutting face—when viewed from the outlines.

Figure 5:
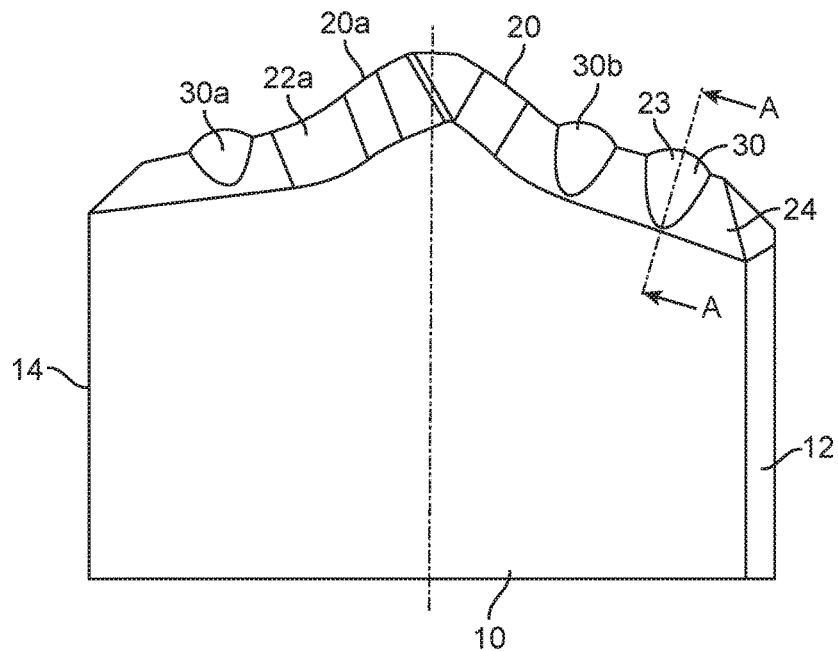
FIG. 5 shows a further front view of a drill plate in one embodiment of the invention.

FIG. 5 shows the drill plate 10 again in a front view. With regard to the details it can be referred to the above description of FIG. 3. FIG. 5 serves mainly to illustrate a cross-section corresponding to a line A-A and the respective arrows. On the first projection 30 the surrounding first free face 24 is continued by a first surface section 23 of the first projection 30. It is to be understood that the first cutting face 22 which is not visible in FIG. 5 is also continued on the first projection 30, namely by a second surface section 26 of the first projection. The surface sections 23, 26 are each configured corresponding to a section of an egg.

Figure 6A:
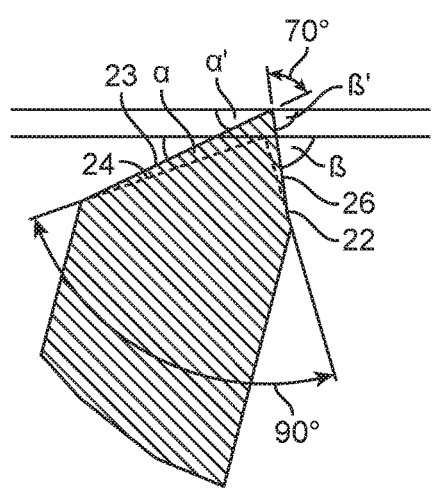
FIGS. 6a to 6c show further embodiments of projections in the cross-sectional view.

FIG. 6a shows a cross-sectional view of the drill plate 10 corresponding to the cross-section illustrated in FIG. 5. Here, the actual outer contour is illustrated at the corresponding location which results from the surface sections 25, 26 of the first projection 30. Furthermore, outer contours of the first cutting face 22 situated next to the first projection 30 and of the first free face 24 also situated next to the first projection 30 are illustrated. These contours are outer contours which the drill plate 10 would adopt at the location illustrated in FIG. 5 if the first projection 30 were not configured.

Based on FIG. 6a, the terms of cutting angle and clearance angle shall initially be described. For this purpose, two parallel lines are drawn in FIG. 6 which are oriented transverse to an axis of rotation of the drill plate 10 when the drill plate is typically used in the drill head of a drill. Relative to the lower line of both lines a clearance angle α can be defined as an angle between the line and the free face 24. Equally, a cutting angle β can be defined as an angle between the line and the cutting face 22. These definitions are continued on the first projection 30 wherein due to the height of the first projection 30 the reference plane which is represented by the lines is also displaced to the top. Thus, on the first projection 30, a clearance angle α' can be defined as an angle between the upper line of both lines and the first surface section 23 of the first projection 30 which surface section is configured as a continuation of the free face 24. Equally, on the first projection 30, a cutting angle β' can be defined as an angle between the upper line of both lines and the surface section 26 of the first projection 30 which surface section is configured as a continuation of the cutting face 22. Corresponding definitions can be used for the other projections 30a, 30b.

In FIG. 6a it can be further seen that in the present case the first cutting face 22 and the first free face 24 are located at an angle of 90°, i.e. perpendicular, to one another. The surface sections 23, 26 of the first projection 30, however, are arranged at an angle of 70° to one another. In particular, this leads to the clearance angle α' on the first projection 30 being larger than the clearance angle a outside of the first projection 30. Equally, this leads to the cutting angle β' on the first projection 30 being larger than the cutting angle b outside of the first projection 30. Thus, the first projection 30 advantageously acts as a breaking and/or crack formation device, e.g. as a concrete breaker in case of the use of the drill plate 10 in the drill head of a concrete drill.

Figure 6B:
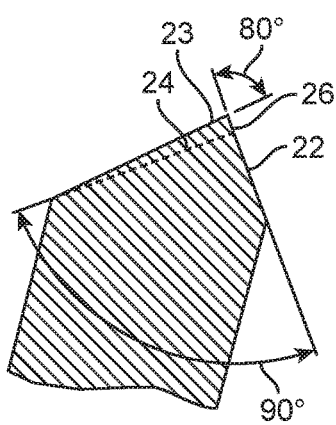
Figure 6C:
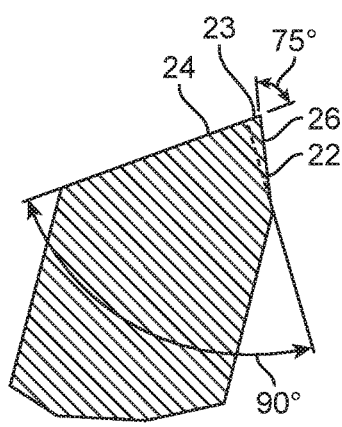

FIGS. 6b and 6c show modifications of the embodiment shown in FIGS. 1 to 6a. Here, the modification is only illustrated in connection with the cross-sectional views which are already known from FIGS. 5 and 6a. FIG. 6b shows an embodiment in which the first projection 30 is configured only as an elevation above the first free face 24. In this way, only the clearance angle α, α' is increased, while the cutting angle β' remains unchanged. In this way, the first cutting face 22 is continued onto the first projection 30 in a planar manner. The angle between the surface sections 23, 26 of the first projection 30 is changed to 80° in the present case.

FIG. 6c shows an embodiment in which the first projection 30 is configured only as an elevation above the cutting face 22. In this way, only the cutting angle β, β' is increased, while the clearance angle a remains unchanged. In this way, the first free face 24 is continued onto the first projection 30 in a planar manner. The angle between the surface sections 23, 26 of the first projection 30 is changed to 75° in the present case.

The embodiments according to FIGS. 6b and 6c can be advantageous depending on the intended use which in particular depends on the condition of the material to be machined.

Figure 7:
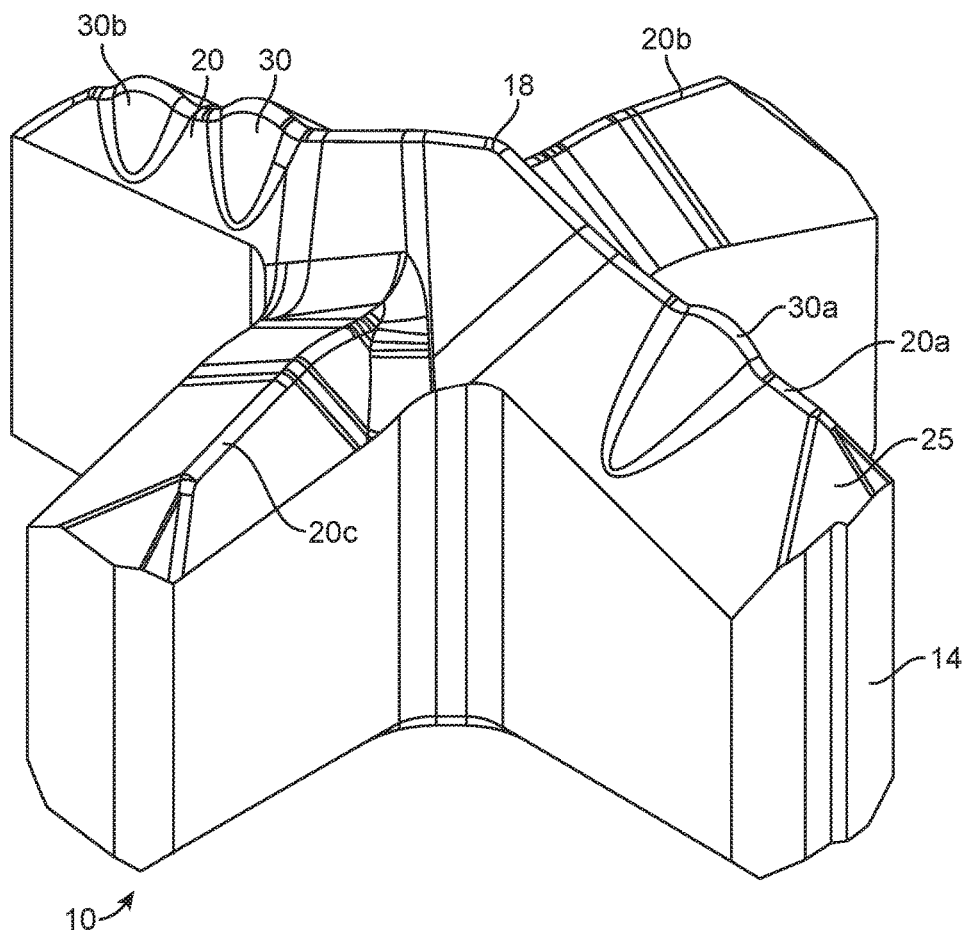
FIG. 7 shows a perspective view of a further embodiment of an inventive drill.

The embodiment of a drill head attachment illustrated in FIG. 7 comprises a tip of a drill 18 which projects furthest.

From the center point 18 the cutting edges 20, 20a extend rearward at an angle in a way known. The contour of the cutting edge 20a is interrupted by a projection 30a, while the contour of the cutting edge 20 is interrupted by two projections 30 and 30b. Both cutting edges end at a chamfer 25 each, before they transition into the outer face 14 of the drill head attachment.

In this embodiment according to FIG. 7 two cutting edges 20b and 20c extend transversely to the cutting edges 20 and 20a. In the embodiment illustrated, they are devoid of projections such that altogether one cutting edge comprises two projections, one cutting edge comprises one projection and two cutting edges comprise no projection.

The projections 30, 30a and 30b are each realized at positions which are radially different from one another, and this is favorable for the breaking effect. In spite of this good breaking effect, the centering by means of the center point 18 is not impaired.

We claim:

1. A drill head insert or drill head attachment for a rock drill in the form of a drill plate made of hard metal, comprising:

cutting edges (20, 20a) configured on a feed side and receding from a tip of a drill (18) rearward to an outer face (12, 14) of the drill plate (10), wherein the drill plate (10) is substantially configured in the form of a roof when viewed facing the outer face (12, 14), and wherein a free face (24, 24a) at the cutting edge (20, 20a) abuts against a cutting face (22, 22a) along a substantial part of an extension of the drill plate (10) between the tip of the drill (18) and the outer face (12, 14), wherein a substantially smooth contour of the cutting edge (20, 20a) is interrupted by at least one projection (30, 30a, 30b) projecting in a feed direction, wherein a clearance angle ($\alpha'$) at a respective projection (30, 30a, 30b) is larger than the clearance angle ($\alpha$) outside of the projections (30, 30a, 30b).

2. The drill head insert or drill head attachment as claimed in claim 1, wherein at least one of the cutting edges (20, 20a) is devoid of a projection along its contour, and wherein at least one other cutting edge (20, 20a) comprises at least one projection (30, 30a, 30b).

3. The drill head insert or drill head attachment as claimed in claim 1, wherein the number of projections (30, 30a, 30b) per cutting edge (20, 20a) is equal and amounts to one.

4. The drill head insert or drill head attachment as claimed in claim 1, wherein at least two cutting edges (20, 20a) comprise a different number of projections (30, 30a, 30b).

5. The drill head insert or drill head attachment as claimed in claim 4, wherein the difference between the number of projections (30, 30a, 30b) on one cutting edge (20, 20a) and the number of projections on another cutting edge (20, 20a) is at least one, wherein one cutting edge (20) comprises two projections, and wherein a further cutting edge (20a) comprises one projection (30a).

6. The drill head insert or drill head attachment as defined in claim 1, wherein a cutting angle ($\beta'$) at a respective projection (30, 30a, 30b) is larger than the cutting angle ($\beta$) outside of the projections (30, 30a, 30b).

7. The drill head insert or drill head attachment as defined in claim 1, wherein the drill plate further comprises a center point at the tip of the drill (18) which center point projects in the feed direction.

8. The drill head insert or drill head attachment as defined in claim 1, wherein the drill plate comprises a chamfer (25) on an end side.

9. The drill head insert or drill head attachment as defined in claim 1, wherein the drill plate comprises a chamfer (25) on both the free face and on the cutting face.

10. A drill comprising a drill head insert as defined in claim 1, wherein the drill being a multi-flute cutter or a two-flute cutter, wherein in the latter case the drill head insert is configured as a drill plate.

11. A drill comprising a drill head attachment as defined in claim 1, wherein the drill head attachment is configured as a solid hard metal head.

12. A drill head insert or drill head attachment for a rock drill in the form of a drill plate made of hard metal, comprising:

cutting edges (20, 20a) configured on a feed side and receding from a tip of a drill (18) rearward to an outer face (12, 14) of the drill plate (10), wherein the drill plate (10) is substantially configured in the form of a roof when viewed facing the outer face (12, 14), and wherein a free face (24, 24a) at the cutting edge (20, 20a) abuts against a cutting face (22, 22a) along a substantial part of an extension of the drill plate (10) between the tip of the drill (18) and the outer face (12, 14), wherein a substantially smooth contour of the cutting edge (20, 20a) is interrupted by at least one projection (30, 30a, 30b) projecting in a feed direction, wherein the at least one projection (30, 30a, 30b) projects beyond both the free face (24, 24a) and the cutting face (22, 22a) as a parabolic contour line when viewed in front view, wherein both parabolas face each other with respective open sides and intersect each other at the cutting edge (20, 20a).

13. A drill head insert or drill head attachment for a rock drill in the form of a drill plate made of hard metal, comprising:

cutting edges (20, 20a) configured on a feed side and receding from a tip of a drill (18) rearward to an outer face (12, 14) of the drill plate (10), wherein the drill plate (10) is substantially configured in the form of a roof when viewed facing the outer face (12, 14), and wherein a free face (24, 24a) at the cutting edge (20, 20a) abuts against a cutting face (22, 22a) along a substantial part of an extension of the drill plate (10) between the tip of the drill (18) and the outer face (12, 14), wherein a substantially smooth contour of the cutting edge (20, 20a) is interrupted by at least one projection (30, 30a, 30b) projecting in a feed direction, wherein the radial position of the at least one projection (30, 30a, 30b) along the contour of the cutting edges (20, 20a) is different, and wherein a projection (30b) is arranged at a position further inwards in the radial direction than another projection (30a) at a another cutting edge (20a).

* * * * *